United States Patent [19]

Fischer

[11] 4,280,419
[45] Jul. 28, 1981

[54] PNEUMATIC SYSTEM FOR CONVEYING GRANULAR MATERIAL

[75] Inventor: Raymond C. Fischer, Hinsdale, Ill.

[73] Assignee: International Harvester Company, Chicago, Ill.

[21] Appl. No.: 779,394

[22] Filed: Mar. 21, 1977

[51] Int. Cl.³ ..................... A01C 7/06; B65G 53/40
[52] U.S. Cl. ........................................ 111/80; 111/9; 111/73; 111/67; 239/654; 406/137; 406/143; 406/144
[58] Field of Search ............... 239/654, 655, 689; 302/53, 54, 57; 111/34, 8, 67, 9, 80, 73; 406/137, 143, 144

[56] References Cited

U.S. PATENT DOCUMENTS

| 496,684 | 5/1893 | Griscom | 302/57 X |
|---|---|---|---|
| 528,419 | 10/1894 | Duckham | 302/57 |
| 1,253,672 | 1/1918 | Decker | 239/654 |
| 1,364,532 | 1/1921 | Von Porat | 302/53 |
| 1,390,974 | 9/1921 | Von Porat | 302/53 |
| 2,696,933 | 12/1954 | Barclay et al. | 302/53 X |
| 2,839,337 | 6/1958 | Dean | 302/53 X |
| 2,968,264 | 1/1961 | Schnell | 111/80 X |
| 2,968,266 | 1/1961 | Gustafson | 111/80 |
| 2,990,186 | 6/1961 | Gandrud | 239/689 X |
| 3,031,983 | 5/1962 | Hanson | 111/80 X |
| 3,179,378 | 4/1965 | Zenz et al. | 302/53 X |
| 3,515,315 | 6/1970 | Kidd | 111/73 X |
| 3,631,825 | 1/1972 | Weiste | 239/655 X |
| 3,826,540 | 7/1974 | Jensen | 302/57 |

FOREIGN PATENT DOCUMENTS

| 1933595 | 1/1971 | Fed. Rep. of Germany | 239/654 |
|---|---|---|---|
| 2363295 | 1/1975 | Fed. Rep. of Germany | 111/73 |
| 1205724 | 9/1970 | United Kingdom | 111/34 |
| 203347 | 9/1967 | U.S.S.R. | 239/654 |
| 288651 | 12/1970 | U.S.S.R. | 302/53 |
| 420269 | 5/1972 | U.S.S.R. | 239/654 |

Primary Examiner—Steven A. Bratlie
Attorney, Agent, or Firm—Neal C. Johnson; F. David AuBuchon

[57] ABSTRACT

A pneumatic seed planter utilizing air pressure to dispense the seeds in a central hopper to a plurality of laterally spaced seed planting assemblies. Mounted on the planter is a system for dispensing granular chemicals such as fertilizers, herbicides and insecticides from a separate hopper to the rows planted by the planting assemblies. The system uses air pressure from the planter (rather than a mechanical drive) to convey the granular material out of the separate hopper to the planting assemblies. Air is directed upwardly through an opening in the bottom of the chemical hopper and into a material conveyor tube spaced from the opening. The granular chemical is drawn through the space and into the conveyor tube by the air stream. A plurality of delivery tubes is connected to the conveyor tube for directing the chemical to the respective plurality of planting assemblies. The rate of delivery into the conveyor tube is controlled by adjusting the position of the tube relative to the inlet opening—the rate increasing with an increase in the space between the opening and the tube. Means are included for directing an auxiliary flow of air into the space to assist movement of material into the conveyor tube. Control means are provided for varying the auxiliary flow in response to varying the space between the opening and tube. Further control means are provided for starting and stopping the dispensing of chemicals automatically in response to movement of the planting assemblies between operative and nonoperative modes.

6 Claims, 13 Drawing Figures

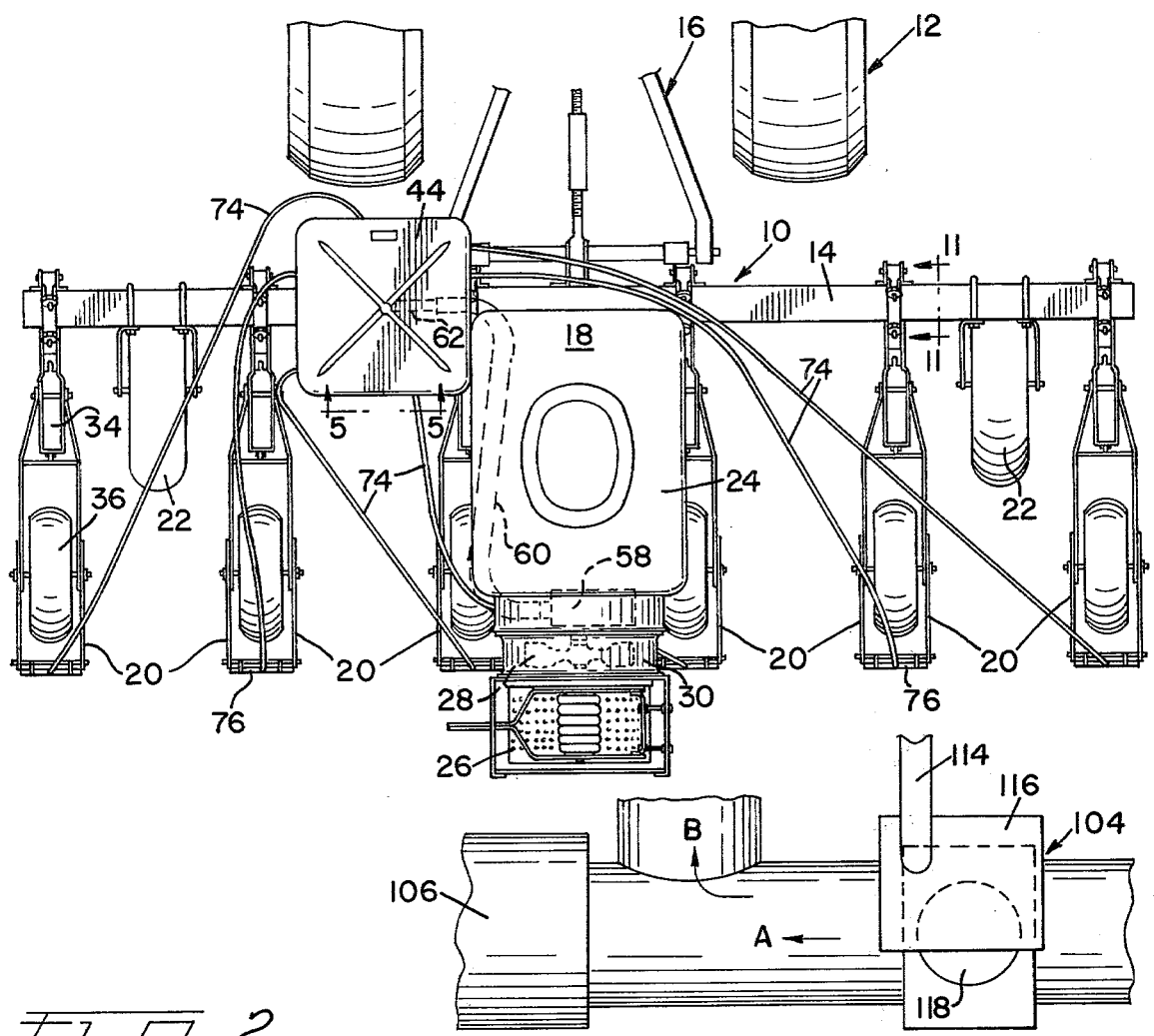
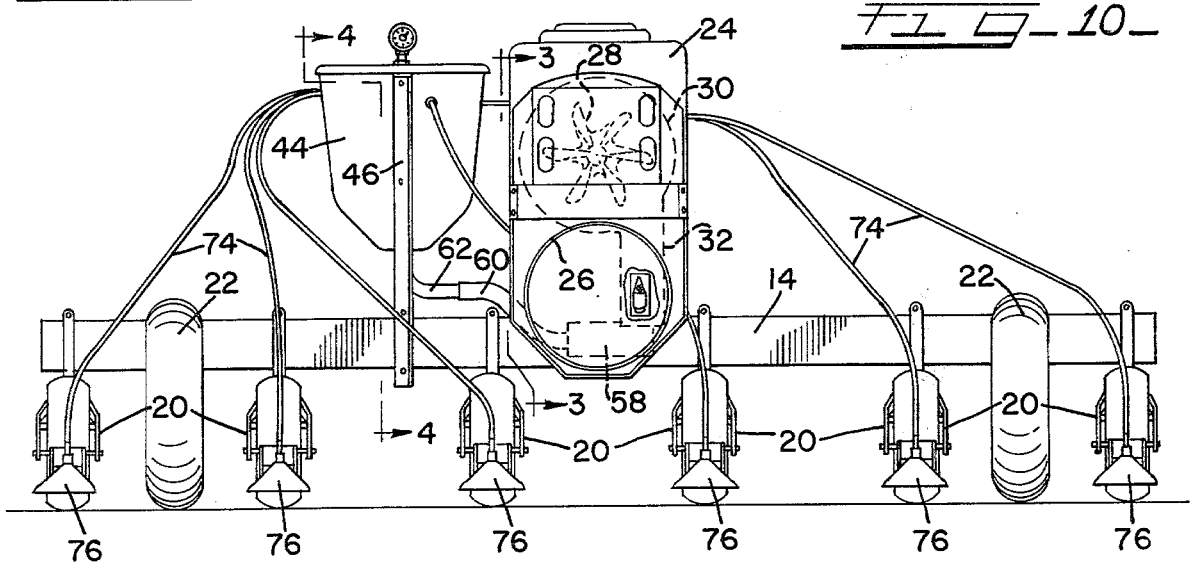

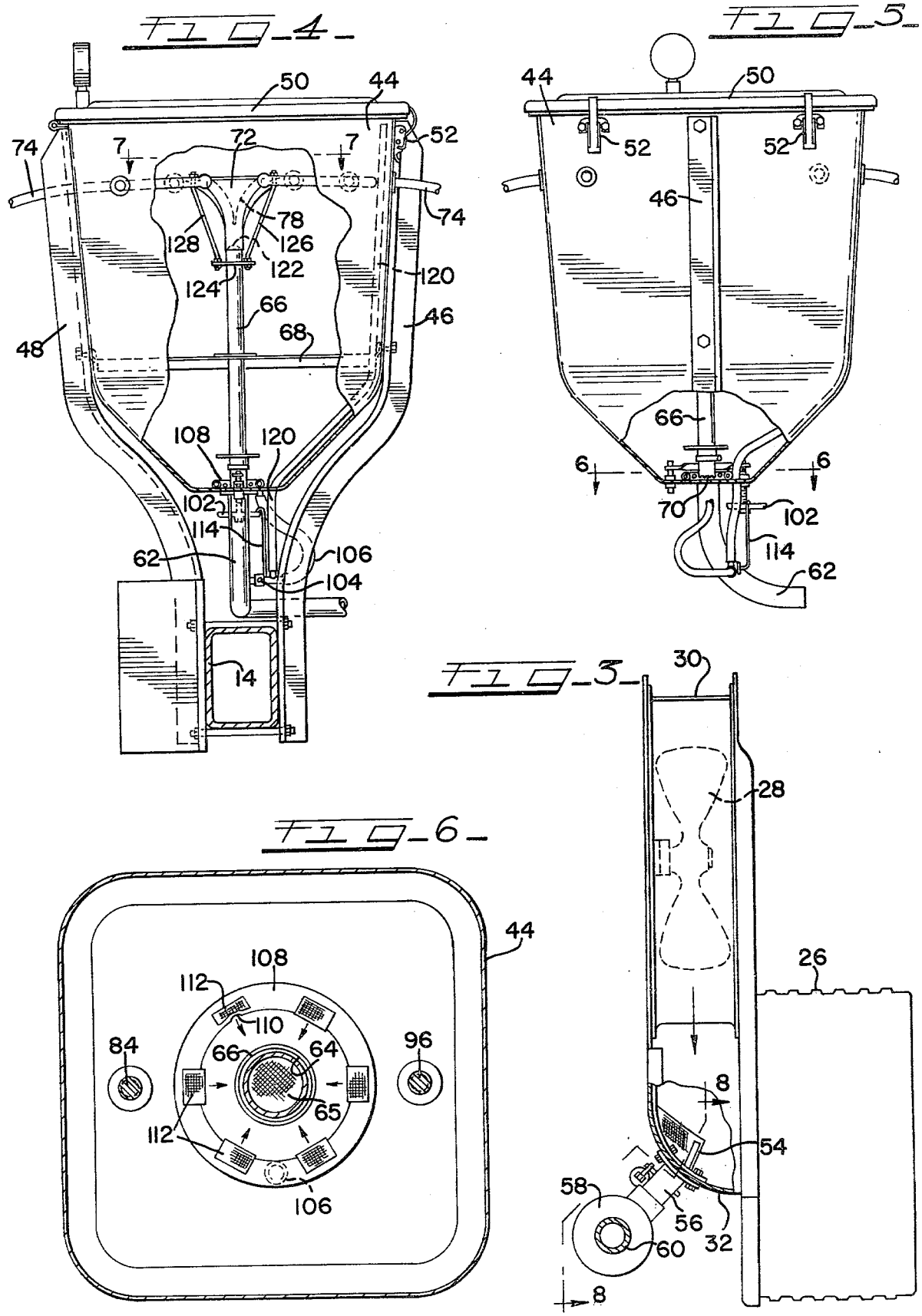

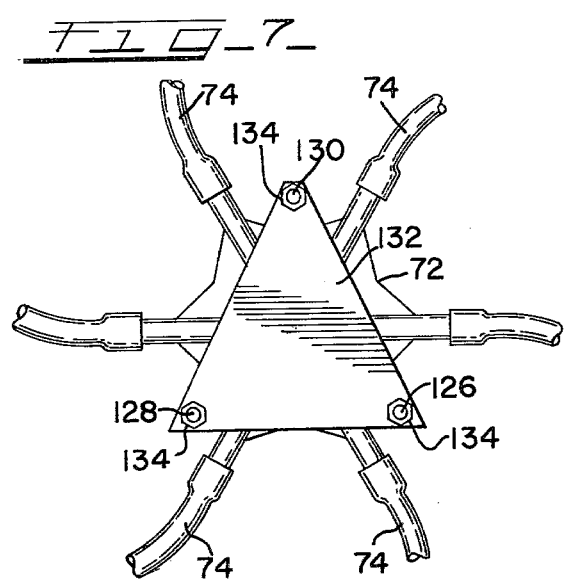
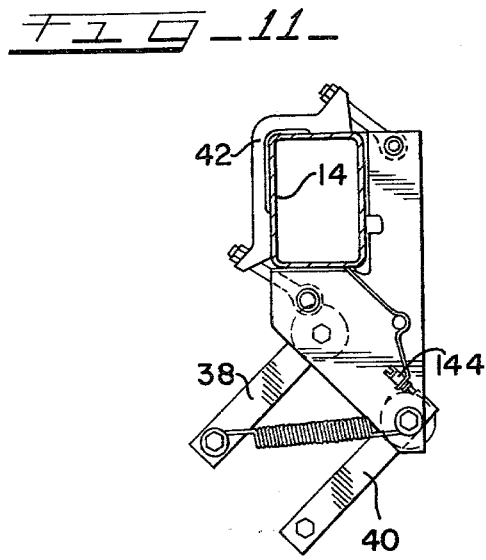
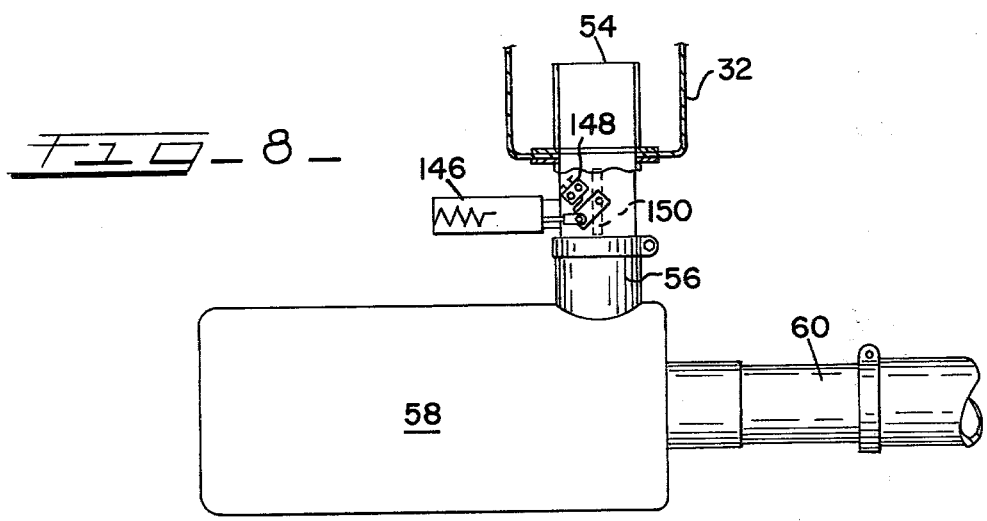
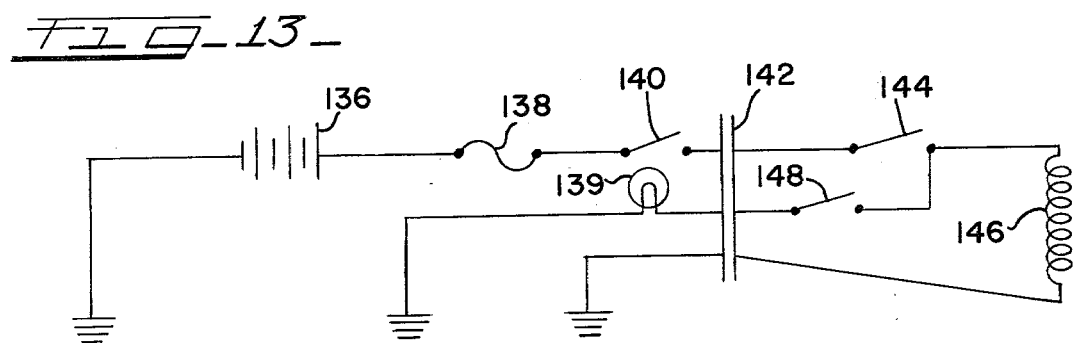

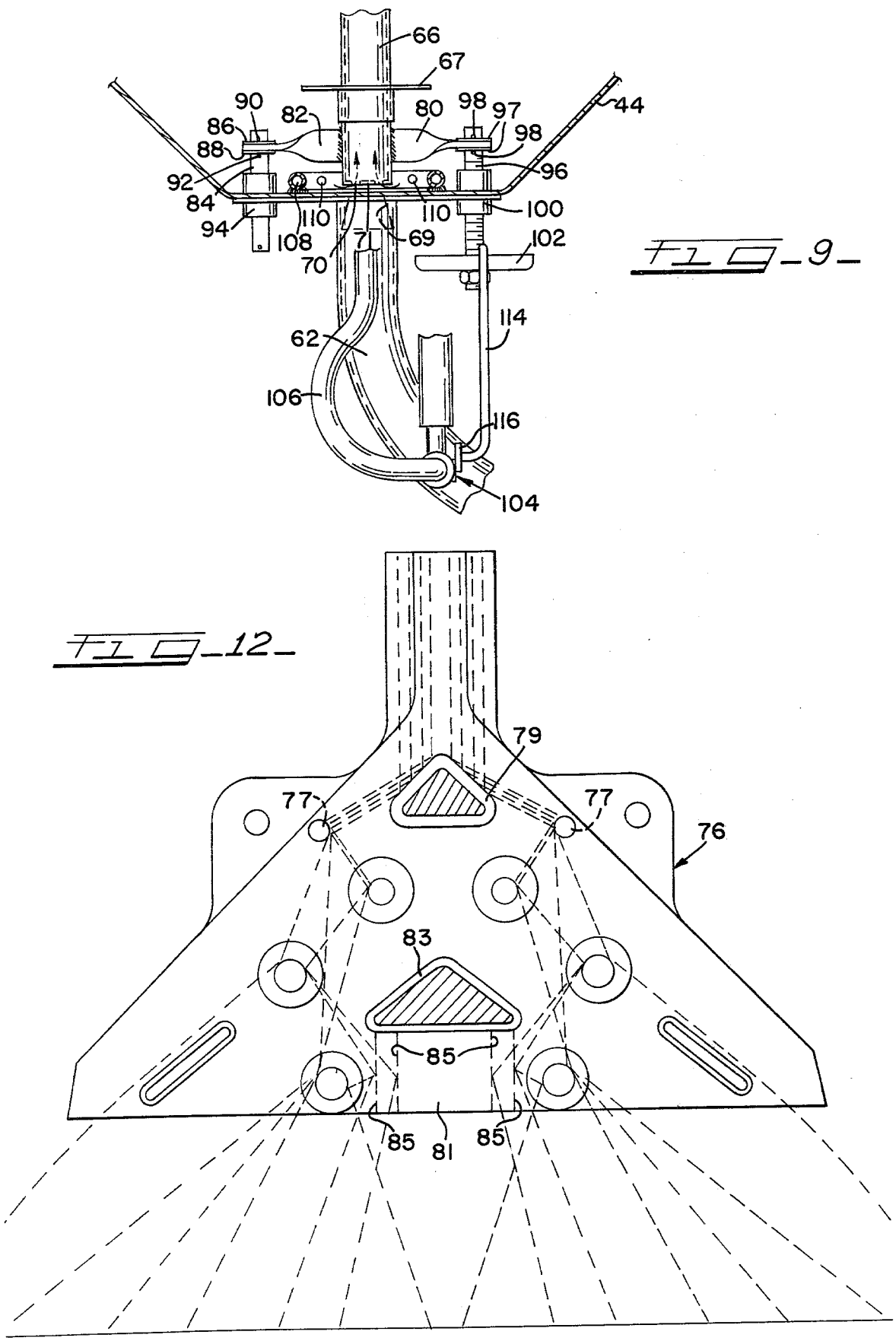

PNEUMATIC SYSTEM FOR CONVEYING GRANULAR MATERIAL

CROSS REFERENCE TO RELATED APPLICATIONS

This application is related to application Ser. No. 681,307 filed Apr. 29, 1976 now U.S. Pat. No. 4,091,968 and owned by the assignee of the subject application.

BACKGROUND OF THE INVENTION

1. Field of the Invention

The invention relates generally to pneumatic conveying and dispensing systems and more particularly, to a field-going machine for applying granular chemicals to crop rows especially in combination with a pneumatic seed planter.

2. Prior Art

It is old in the art to dispense seeds or the like from a central hopper to a plurality of tubes by an air stream. Such is shown in U.S. Pat. Nos. 3,804,036 and 3,189,230. The use of an air stream as a material conveyor is shown in a more simple context in U.S. Pat. No. 2,941,842.

Practical problems with such devices would arise in areas of adaptability to a variety of materials to be dispensed. Considerations of adaptability may involve the need for controls which permit the operator to preselect, maintain and/or change operational characteristics from material-to-material. Another practical problem would relate to efficiency of application of the chemical—not only the efficiency as denoted by a variable overall rate of application (note deflector 49 in the '230 patent)—but more precisely to maintain an efficient and uniform rate of application for each row.

A further practical problem in dispensing granular chemicals pneumatically is that the material can attain a moisture content conducive to the formation of lumps. The conveying air stream in itself may not be sufficient to break up the lumps. Accordingly, blockage or intermitent nonuniform flow rates may result. A typical solution to such a problem is to incorporate a mechanical agitator within the hopper to break up the material so that the same will flow uniformly into the air stream. Of course, all mechanical systems are subject to wear, repair and replacement.

SUMMARY

The invention provides a machine for pneumatically metering, conveying and distributing granular material utilizing controls which provide efficient distribution of a variety of materials. A specific form of the invention provides a known pneumatic planter with a chemical distribution system powered exclusively by the air source of the planter with no interference with the planter's operation. The chemical distribution system includes a unique discharge assistant functional at the air-material interface to increase the efficiency of the system. Means are included for varying the output of the discharge assistant in response to varying the discharge rate of the material. Further control means are included for correlating the operation of the chemical distribution system to the starting and stopping of the planting operation.

Briefly, the objects of the invention are to provide a pneumatic metering, conveying and distributing system: effective to dispense a variety of granular materials; including controls enabling the operator to vary the overall rate of delivery of material as well as varying the delivery rate in a plurality of delivery paths; capable of dispensing material without requiring mechanical agitators or the like; providing uniform distribution rates; and usable in combination with a pneumatic seed planter whose source of air under pressure is the sole means for powering the system—all without adversely effecting operation of the planter.

BRIEF DESCRIPTION OF THE DRAWINGS

FIG. 1 is a plan view of a tractor-mounted pneumatic planter incorporating the granular material applicator of the invention;

FIG. 2 is a rear elevation view of the planter and apparatus of FIG. 1;

FIG. 3 is a fragmentary elevational view taken in the direction of arrows 3—3 of FIG. 2;

FIG. 4 is an enlarged elevation taken in the directions of arrows 4—4 of FIG. 2;

FIG. 5 is a side elevation view of the structure of FIG. 4;

FIG. 6 is an enlarged sectional view taken in the direction of arrows 6—6 of FIG. 5;

FIG. 7 is an enlarged fragmentary view taken in the direction of arrows 7—7 of FIG. 4;

FIG. 8 is an enlarged fragmentary view taken in the direction of arrows 8—8 of FIG. 3;

FIG. 9 is an enlarged fragmentary view of a portion of FIG. 5;

FIG. 10 is an enlarged fragmentary view of control valve structure of FIGS. 4 and 5;

FIG. 11 is an enlarged sectional view taken in the direction of arrows 11—11 of FIG. 1;

FIG. 12 is an enlarged elevation view of the material spreaders or banders of FIGS. 1 and 2; and FIG. 13 is a schematic view of the electrical control system of the invention.

DESCRIPTION OF THE PREFERRED EMBODIMENT

Referring first to FIGS. 1 and 2 a pneumatic planter 10 is shown coupled to an agricultural type tractor 12. In practice the planter 10 includes a tool bar 14 of rectangular hollow section connected directly to a three point hitch 16 of the well known type associated with modern agricultural tractors. The planter 10 is thus of the so-called "fully mounted" type movable between raised transport and lowered planting positions by actuation of the three point hitch 16. The planter 10 is of the type marketed by the assignee of this application under the name CYCLO. As such it includes a central seed dispenser unit 18 mounted on the tool bar 14 for pneumatically delivering seeds through tubes (not shown) to a plurality of seed planting assemblies 20 mounted in uniformly spaced relation on the tool bar 14. Gauge wheels 22 may be secured on the tool bar 14 for ground support of the planter during operation.

The dispenser unit 18 is constructed and operated as shown in more detail in U.S. Pat. No. 3,885,704. The unit includes a seed hopper 24 equipped for gravity feeding of seeds into a rotatable seed drum 26 into which air under pressure is introduced by a blower fan 28. The fan 28 is mounted within a generally cylindrical housing 30 from which air is directed into the seed drum 26 through a conduit 32 best shown in FIG. 3. The seed planting units 20 are of conventional construction including furrow openers 34 and press wheels 36 all supported for vertical movement relative to the tool bar 14 on upper and lower parallel links shown at 38 and 40 respectively in FIG. 11. FIG. 11 also shows clamp structure 42 by which each of the units 20 is secured to the tool bar 14.

In accordance with the invention the planter is provided with an apparatus for applying granular chemicals to the rows being planted. A hopper 44 is supported on the tool bar 14 between mounting standards 46 and 48 bolted to the bar 14 as best shown in FIG. 4. The hopper 44 is topped by a hinged cover 50 which provides a substantially air tight enclosure for the hopper when held in closed position by latches shown at 52 in FIGS. 4 and 5. A primary conduit system is provided for selectively directing air under pressure from the planter into the hopper 44 for material-conveying purposes to be described. Referring to FIGS. 3 and 8 an air scoop 54 is mounted within the duct 32 in communication through the duct wall with a short tube 56. Connected to the tube 56 is an air cleaner 58 which is connected to an elongated flexible tube 60 which, as shown in dotted lines in FIG. 1, extends beneath the dispenser unit 18 forwardly toward the hopper 44. Another tube 62 is connected to the tube 60 and communicates with the hopper 44 through an air inlet opening 64 (FIG. 6) defined through the bottom of the hopper. The opening 64 is covered with a fine mesh screen 65 shown in FIG. 6. The upper end of the tube 62 is formed with an annular converging portion 69 (FIG. 9) creating a venturi effect at the air inlet opening 64. This increases the air velocity and material conveying capacity.

The invention includes means for utilizing the air flow into the hopper 44 for conveying granular material out of the hopper and onto the planted rows. A material conveyor tube 66 of rigid construction is supported vertically within the hopper 44 by means including an L-section cross brace 68 extending across the interior of the hopper. As best shown in FIG. 9 the tube 66 includes an inlet end 70 disposed in spaced relation above and coaxially with the inlet opening 64 in the bottom of the hopper. The space between the tube 66 and the air inlet opening 64 permits granular material in the hopper 44 to be drawn into the tube 66 by the air stream flowing upwardly into the tube 66 from the tube 62. As shown in FIG. 9 the inlet end 70 includes circumferentially spaced notches 71. The notches 71 are arranged to reduce the area by approximately one half through which material can flow when the inlet end 70 is near its lowermost setting for low rates of application. This has been found to provide better flow uniformity at such low application rates. An annular plate 67 is secured to the tube 66 to reduce the pressure differential exerted by the material at the material-air flow interface as imposed by material when the hopper is nearly full or nearly empty. The plate 67 provides a more uniform head of material over the air-material interface.

Material is distributed from the tube 66 to the planting units 20 by means including a manifold 72 mounted on the upper end of the tube 66 and a plurality of flexible seed delivery tubes 74 interconnecting the manifold 72 with material spreaders 76 mounted on respective planting units 20 (FIGS. 1 and 2). The manifold 72 includes a central cone like structure 78 shown in dotted lines in FIG. 4 shaped to direct the upward air stream into a plurality of circumferentially spaced outwardly curved passages communicating with the respective delivery tubes 74. The spreaders 76 are essentially of conventional construction modified somewhat to provide more uniform distribution or "banding" across the crop row. As shown in FIG. 12 a pair of pins 77, 77 are installed through the spreader 76 on opposite sides of the standard triangular deflector block 79 to disperse material deflected outwardly by the block 79. Additionally, a block 81 is installed beneath a standard triangular deflector block 83 and includes vertical deflector surfaces 85.

Means are provided for adjusting the vertical space between the tube inlet end 70 and the hopper inlet opening 64 for selectively varying the rate of entry of granular material into the conveyor tube 66. With reference to FIGS. 4 and 5 in general, and more specifically to FIG. 9, bars 80 and 82 are welded to the lower end of the conveyor tube 66 in diametrically opposed relation. Each of the bars 80 and 82 is twisted 90° as shown to provide horizontal outer ends. A rod 84 is connected to the bar 82 by a pair of washers 86 and 88 flanking the bar and secured in place by cotter pins 90 and 92. The rod 84 extends downwardly through a collar 94 fixed in the bottom of the hopper 44.

An adjustment screw 96 is rotatably connected to the bar 80 by washers 97 and cotter pins 98 in the same manner as the rod 84 is connected to the bar 82. The screw 96 is externally threaded therebeneath and is threadedly received in an internally threaded collar 100 fixed in the bottom of the hopper 44. A dish shaped adjustment disc 102 is secured to the lower end of the adjustment screw 96 providing for external manual adjustment of the vertical position of the conveyor tube 66. It will be understood that the tube 66 is slidably retained in the hopper cross brace 68 (FIG. 4) permitting the entire tube 66 and associated structure to be shifted vertically in response to rotation of the adjustment disc 102. If desired the portion of the rod 84 extending beneath the collar 94 may be provided with a vertical numbered scale providing a visual indication of the material-inlet space between the tube end 70 and the hopper inlet opening 64.

The invention includes means for assisting the movement of material from the hopper 44 into the air stream flowing into the conveyor tube 66. As shown generally in FIG. 4 an air flow control valve 104 is tapped into the main air supply tube 62. A flexible tube 106 extends upwardly from the valve 104 into communication with a hollow annular tube 108 secured on the bottom of the hopper 44 concentrically about the air inlet opening 64 (FIG. 6). As apparent in FIGS. 6 and 9 the annular tube 108 includes a plurality of circumferentially spaced radially inwardly directed air outlet openings 110 from which air is directed toward the space between the hopper bottom and the tube inlet end 70. As shown in FIG. 6 the annular tube 108 may be provided with a plurality of small screens 112 soldered thereto above respective openings 110 to reduce the possibility of material blocking the openings.

The invention includes means for varying the air flow from the annular tube 108 in response to varying the space between the air inlet opening 64 and the tube inlet 70. As shown generally in FIGS. 4 and 5 and more specifically in FIGS. 9 and 10 a rod 114 is hooked over the lip of the circular disc 102 and extends downwardly into pivotal connection with a valve control plate 116 secured to a rotatable valve spool 118. The rotated position of the spool 118 controls the amount of air flow through the valve 104 in the direction of the arrow "A" in FIG. 10 into the tube 106. As set up in practice, rotation of the control disc 102 to raise the conveyor tube 66 simultaneously raises the rod 114 as the disc 102 moves upwardly with the adjustment screw 96. This causes the spool 118 to be rotated toward a maximum open position within the air passage (not shown) of the valve 104 to thus increase the air flow through the tube 106, into the annular tube 108, and out of the openings 110.

The invention includes means for pressurizing the hopper 44 to further assist movement of material into the conveyor tube 66. As shown generally in FIG. 4 a flexible tube 120 is connected from downstream of the valve body 104 upwardly through the bottom of the hopper 44 terminating just below the hopper cover 50. The air flow from the valve 104 into the tube 120 is in the direction of arrow "B" in FIG. 10.

It is apparent with reference to FIGS. 1 and 2 that the seed delivery tubes 74 are of different lengths as determined generally by the varying distances from the hopper 44 to the various seed planting units 20. Since there is of course frictional resistance to the movement of air through a conduit or tube, there will be a greater flow rate through a short tube than through a long tube. And when the air stream is used to convey material, a greater volume of material will be conveyed through a short tube. The invention provides means for optimizing the uniformity of material delivery to the various material spreaders 76 (FIG. 2). With reference to FIGS. 4 and 7 the manifold 72 rests on a semi-spherical seat 122 defined on the upper end of the conveyor tube 66. A triangular base plate 124 is fixed to the tube 66. Three adjustment rods 126, 128, and 130 are connected to the base plate 124 and extend outwardly and upwardly beyond the top of the manifold 72. As best shown in FIG. 7 the adjustment rods 126, 128, and 130 project upwardly into connection with a triangular adjustment plate 132 seated on the top of the manifold 72. The rods are connected to the plate 132 by hex nuts 134.

In the initial installation of the seed distribution system an attempt is made to connect the seed delivery tubes 74 to the manifold 72 such that the shortest tube is diametrically opposite the longest tube and with the intermediate tubes being progressively arranged by length therebetween. The hex nuts 134 are then turned relative to each other to tilt the adjustment plate 132 downwardly toward the shortest of the tubes 74. As apparent with reference to FIG. 4 this tilts the manifold 72 about the semi-spherical seat 122. The cone 78 is thus shifted laterally relative to the upwardly moving air stream toward the shortest tubes 74 reducing the volume of air flowing into those shorter tubes. The net effect is to provide a more uniform rate of delivery of material to the various crop rows in spite of the differences in length of the various seed delivery tubes.

The apparatus of the invention is actuated through an electrical control system powered by the electrical system of the tractor 12. As shown schematically in FIG. 13 the tractor portion of the system includes a battery 136, a fuse 138, a light 139, and a manual on-off switch 140. The numeral 142 designates a plug-type connection of the implement portion of the system into the tractor portion. The implement portion includes a switch 114, an internally spring biased solenoid 146, and a switch 148.

As shown in FIG. 8 the solenoid 146 is operatively connected to a butterfly valve 150 disposed within the conduit 56 through which air is drawn from the planter air conduit 32. The valve 150 is operable by the solenoid 146 between positions opening and closing the conduit 56 to thus control the starting and stopping of material delivery by the apparatus of the invention.

The valve 150 is automatically operable in response to shifting the planter 10 between operative and transport positions. Actuation of the three point hitch 16 to raise the planter 10 moves the tool bar 14 upwardly. Since the planting assemblies 20 are mounted on the respected pairs of links 38 and 40 (FIG. 11) the links pivot downwardly as the weight of the planting assemblies 20 is applied. The switch 144 is mounted so as to be engaged and opened by the lower link 40 as the planter is raised. As seen in the schematic view of FIG. 13 opening the switch 144 deactuates the solenoid 146 so that the internal spring therein will close the valve 150. A further desirable feature is the operative relationship of the valve 150 and the indicator light 139 through the mechanical interconnection of the valve 150 and the light switch 148. The valves 150 when in its open position retains the switch 148 in a closed position wherein the light 139 is energized. Conversely, when the valve is closed the switch is opened and the light is off. Accordingly, the the tractor operator has the visual indication of the operating status of the material applicator.

By the foregoing Applicant has provided a combination directed toward accomplishing the objects of the invention.

What is claimed is:

1. In combination with a seed planter including a mobile frame, seed planting assemblies movable between a planting position and a transport position, and a source of air under pressure, an improved apparatus for applying granular chemicals onto the ground, comprising:
   an enclosed hopper on the frame for holding the granular material to be applied, said hopper having an air inlet opening defined therein;
   primary conduit means for directing air under pressure from said source to said air inlet opening in said hopper;
   a material conveyor tube mounted within said hopper and having an inlet end disposed in spaced communication with said air inlet opening, whereby air under pressure can flow from said air inlet opening into and through said conveyor tube;
   at least one material delivery tube connected to said conveyor tube for directing material therefrom out of the hopper for ground application;
   means for adjusting the space between said tube inlet end and said hopper air inlet opening whereby the rate of entry of material into said conveyor tube may be varied;
   a discharge assistant disposed in the space between said inlet end and said air inlet opening for directing an auxiliary flow of air into said space to assist the movement of material into said conveyor tube;
   auxiliary conduit means for directing air under pressure from said source to said discharge assistant;
   means for opening and closing said primary conduit means in response to movement of said seed planting assemblies to said planting position and said transport position respectively; and
   means for varying the air flow of said discharge assistant in response to varying the space between said tube inlet end and said air inlet opening.

2. In combination with a seed planter of the type having a source of air under pressure for conveying seeds to a plurality of seed planting units for planting multiple rows, an apparatus on the planter for applying granular chemicals to the ground on the rows, comprising:

an enclosed hopper for holding the granular material, said hopper having an air inlet opening defined through the bottom thereof;

a primary conduit connected between said source of air and said air inlet opening for directing air under pressure into said hopper;

a material conveyor tube mounted within said hopper coaxially with said air inlet opening and having an inlet end disposed in spaced communion with said air inlet opening whereby material may be drawn into said conveyor tube by the air flowing from said air inlet opening into said tube;

a material delivery manifold mounted on said conveyor tube for directing material in a plurality of separate paths corresponding to the number of said seed planting units;

a plurality of material delivery tubes interconnecting said paths with respective seed planting units for directing material out of said hopper to said assemblies for ground application;

a hollow ring in said hopper disposed about said air inlet opening in the space between said air inlet opening and said conveyor tube, said ring having a plurality of air outlet openings defined therein for directing air generally radially inwardly of the ring;

a secondary conduit connected between said primary conduit and said ring for directing a flow of air into said ring and out of said air outlet openings to assist movement of material into said conveyor tube;

means for adjusting the position of said inlet end of said tube relative to said air inlet opening, whereby the rate of entry of material into said conveyor tube may be selectively varied; and means for varying the air flow out of said ring in response to adjusting the position of said inlet end of said tube.

3. In a machine for dispensing granular material and having a source of air under pressure, the improvement comprising:

an enclosed hopper for holding the granular material to be applied, said hopper having an air inlet opening defined therein;

primary conduit means for directing air under pressure from said source to said air inlet opening in said hopper;

a material conveyor tube mounted within said hopper and having an inlet end disposed in spaced communication with said air inlet opening whereby air under pressure can flow from said air inlet opening into and through said conveyor tube carrying the material therewith;

a material delivery tube connected to said conveyor tube for directing material therefrom out of the hopper;

means for adjusting the space between said tube inlet end and said hopper air inlet opening whereby the rate of entry of material into said conveyor tube may be varied;

a discharge assistant disposed in the space between said inlet end and said air inlet opening for directing an auxiliary flow of air into said space to assist the movement of material into said conveyor tube;

an auxiliary conduit means for directing air under pressure from said source to said discharge assistant; and means for varying the air flow of said discharge assistant in response to varying the space between said tube inlet end and said air inlet opening.

4. The subject matter of claim 3, including third conduit means for directing air under pressure from said source into said hopper to pressurize the same, thereby further assisting the movement of material into said conveyor tube.

5. The subject matter of claim 4, including means for varying the air flow through said third conduit means in response to varying the space between said tube inlet end and said air inlet opening.

6. In a machine for dispensing granular material and having a source of air under pressure, the improvement comprising:

an enclosed hopper for holding the granular material to be applied, said hopper having an air inlet opening defined therein;

primary conduit means for directing air under pressure from said source to said air inlet opening in said hopper;

a material conveyor tube mounted within said hopper and having an inlet end disposed in spaced communication with said air inlet opening whereby air under pressure can flow from said air inlet opening into and through said conveyor tube carrying the material therewith;

a material delivery tube connected to said conveyor tube for directing material therefrom out of the hopper;

means for adjusting the space between said tube inlet end and said hopper air inlet opening whereby the rate of entry of material into said conveyor tube may be varied;

a discharge assistant disposed in the space between said inlet end and said air inlet opening for directing an auxiliary flow of air into said space to assist the movement of material into said conveyor tube;

an auxiliary conduit means for directing air under pressure from said source to said discharge assistant;

third conduit means for directing air under pressure from said source into said hopper to pressurize the same, thereby further assisting the movement of material into said conveyor tube; and means for varying the air flow through said third conduit means in response to varying the space between said tube end and said inlet opening.

* * * * *